United States Patent [19]

McLean

[11] 4,199,112
[45] Apr. 22, 1980

[54] PROCESSOR AND BIDIRECTIONAL CUTTING DISC

[75] Inventor: James O. McLean, Milford, Conn.

[73] Assignee: General Electric Company, New York, N.Y.

[21] Appl. No.: 954,552

[22] Filed: Oct. 25, 1978

[51] Int. Cl.² .................................................. B02C 18/18
[52] U.S. Cl. ..................................... 241/92; 241/273.2
[58] Field of Search ................... 241/92, 199.12, 282.1, 241/282.2, 273.1, 273.2, 273.3, 273.4; 83/578

[56] References Cited

U.S. PATENT DOCUMENTS

| | | | |
|---|---|---|---|
| 58,570 | 10/1866 | Arnold . | |
| 243,139 | 6/1881 | Kimmel . | |
| 1,182,214 | 5/1916 | Sanford . | |
| 1,964,290 | 6/1934 | Krause | 241/273.2 X |
| 2,678,073 | 5/1954 | De Nardis . | |
| 2,695,643 | 11/1954 | Aberer | 241/273.3 X |
| 2,882,946 | 4/1959 | Green et al. | |
| 3,085,607 | 4/1963 | Schottle . | |
| 3,610,304 | 10/1971 | Poreil et al. | 241/92 |
| 3,892,365 | 7/1975 | Verdun | 241/282.1 X |

FOREIGN PATENT DOCUMENTS 1211993  11/1970  United Kingdom .................. 241/273.1

Primary Examiner—Howard N. Goldberg
Attorney, Agent, or Firm—John F. Cullen; George R. Powers; Leonard J. Platt

[57] ABSTRACT

In a food processor with a power base and lid-covered bowl, a cutting disc is rotated by a shaft extending into and terminating in the bowl, and structure is provided to reverse the shaft rotation on selection. In this general arrangement, an improvement is provided in the cutting disc comprising a first cutting member on the disc surface facing in the direction of the selected shaft rotation and a second cutting member is provided on the same disc surface facing opposite the first cutting member with the cutting members being substantially diametrically opposite for dynamic balance. The cutting members are preferably on different levels on the disc surface with slanted ramps connecting the levels. The arrangement is such that one of the cutting members performs a cutting operation when the disc is rotated in one direction while the other member is rendered inoperative and, on shaft reversal, the other member performs the cutting operation while the one member becomes inoperative. The disc may be reversible with an additional pair of diametrically opposed cutting members on the opposite disc surface to provide up to four different cutting functions all on a single disc by reversing the disc and reversing the rotation.

12 Claims, 4 Drawing Figures

PROCESSOR AND BIDIRECTIONAL CUTTING DISC

1. Field of the Invention

The invention relates to a food processor having a power base and a lid-covered bowl with a cutting disc rotated by a reversible shaft means extending into and terminating in the bowl. To this general arrangement as described in a food processor, an improvement is provided in the disc structure comprising a first cutting member on the disc surface facing in the direction of the selected shaft rotation and a second cutting member on the same disc surface facing opposite the first cutting member so that the same disc performs different cutting operations when the driving shaft is rotated in different directions.

2. Description of the Prior Art

It is known to use food processors, a device fitting in the speed range between blenders and mixers, as a multi-purpose kitchen apparatus that uses generally multiple interchangeable rotary tools such as blades, knives, cutting and rasping discs, and various other attachments for blending, mixing, grating, grinding, chopping, slicing, whipping, and other operations in a short time. Such processors have become a commonly used kitchen appliance. They usually comprise a power base with a lid-covered bowl or the equivalent supporting portion and a vertically driven shaft extending into the bowl that carries cutter in the base of the bowl or various forms of slicing discs that operate immediately below the lid and usually receive food from a feed chute through the lid. The lid is generally interlocked with the motor circuit to inactivate the processor when the lid is removed and the sharp cutting means or discs are exposed. Such food processors are generally well known and various forms of discs with knives, rasps, interchangeable cutters, have been known in one form or another usually with the disc performing a single specific operation. Generally, such processors may be supplied with a kit of different discs having various cutters for different cutting functions. Also, it is known to provide a processor with a different cutter on each side of the disc whereby the disc is turned over and the same disc then provides a different cutting function thus reducing the number of discs required and permitting storage within the processor bowl itself and such a device is shown in co-pending application Ser. No. 799,497 filed May 23, 1977, now abandoned and succeeded by continuation-in-part application Ser. No. 967,042, filed Dec. 6, 1978 of common assignment.

An object of the invention is to provide a food processor of the general known type with an improved cutting disc that has multiple cutting capabilities on a single disc by reversing the rotation of the shaft.

Another object is to provide such a processor with a single disc with reverse facing cutters and which disc may be reversed itself to provide up to four different cutting functions on a single disc.

Still a further object is to provide a disc having cutters facing in opposite directions so that in use with reversible shafts the single disc provides dual cutting functions and, by providing another pair of cutters on the opposite disc surface, the single disc may provide up to four different cutting functions.

SUMMARY OF THE INVENTION

Briefly described, the invention is directed to a food processor and, separately to a disc structure, whereby the processor has a power base and a lid-covered bowl with a cutting disc designed to be rotated by shaft means extending into and terminating in the bowl. In the food processor combination, means is provided to reverse shaft rotation and to this general structure an improved disc comprises a first cutting member on the disc surface facing in the direction of a selected shaft rotation and a second cutting member on the same disc surface facing opposite the first cutting member such that when one of the members performs a cutting operation in either direction of disc rotation then the other member is automatically rendered inoperative. The disc may have a similar pair of additional cutting members on its opposite surface so that reversing the disc and reversing the shaft rotation provides up to four different cutting functions on a single disc. Thus, the main object of the invention is to provide an improved disc construction that may be used in a food processor combination or elsewhere whereby a single disc has multiple cutting capabilities by merely reversing the disc and reversing the rotatable driving shaft.

DESCRIPTION OF THE PREFERRED EMBODIMENT

The device will be described as used in a food processor of a general known type as a matter of convenience although it will be apparent that the improved disc may be used in combination with any reversible rotatable shaft where different cutting functions are desired.

Figure 1:
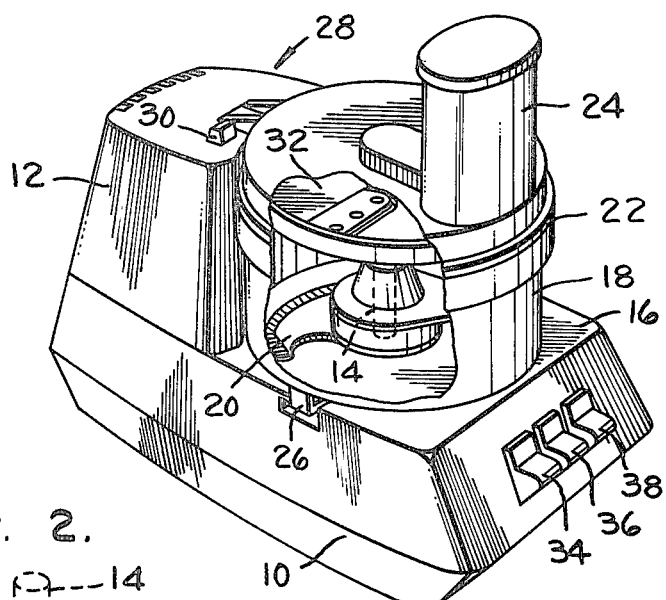
FIG. 1 is a perspective view, partially in section, showing a processor arrangement.

Referring to FIG. 1, there is shown a food processor including a basic blender-type power base 10 and preferably L-shaped with an upstanding motor containing housing unit 12 which has a suitable motor such as a lower cost series motor driving a power shaft 14 by any suitable link between the power unit and shaft as well known in the art. Any power base 10 will suffice, but the L-shape is preferred since it presents an overall low profile desirable in a kitchen appliance. Disposed on the bowl-supporting portion 16 of the base is a removable bowl 18 with its separate removable cutting mechanism 20 well known in the art. These cutters perform a chopping operation on foods. Bowl 18 is a relatively large bowl having a removable lid 22 generally with an integral feed chute 24 by which food is introduced to the bowl. The bowl is locked in position on the base by suitable lugs 26 by rotating it into position on supporting porton 16. Thus, the bowl and cutter 20 are supported on portion 16 with the cutter being driven from motor unit 12 in the base 10 generally at a given speed. To prevent access to the moving cutter mechanism 20 in the bowl, the lid is secured to the bowl 18 by an interlocking mechanism generally indicated at 28 and releasable by knob 30 as detailed in U.S. Pat. No. 4,111,372 of common assignment. Various speed control buttons are provided on the power base 10 to include features such as a "pulse" button 34 that intermittently drives the shaft when the button is depressed, a "run" button 36 for steady operation of shaft 14 and, in accordance with the present invention, a "reverse" button 38 that may be used to reverse the rotation of shaft 14, in any suitable maner such as providing a reversing transmission on a unidirectional motor or a reversing motor or a suitable idler pulley in a belt-driven motor—being merely a reverse button for reversing rotation of shaft 14 in a suitable conventional manner.

Figure 2:
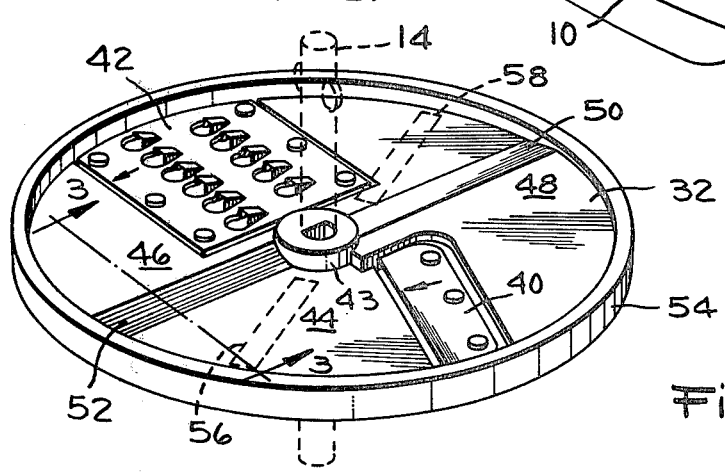
FIG. 2 is a perspective view of the improved disc with a driving shaft shown dotted.
Figure 3:
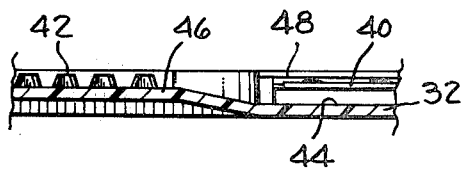
FIG. 3 is a partial section on line 3—3 of FIG. 2, and, FIG. 4 is a modification using a mixer as the power base for driving the disc.

For multiple food processing steps, it is known to provide one or more cutting discs 32 that may contain rasping or grating or slicing cutters as shown in FIGS. 5 and 6 of U.S. Pat. No. 3,892,365. Such disc cutters adre used separately from the chopping cutters 20 and the discs operate just below the lid adjacent feeding chute 24 for performing separate cutting operations into the bowl. Customarily, a separate disc is provided for each cutting operation and the discs are stored separately and are used although it is known to use insertable cutters by providing a longitudinal cut-out completely across the disc and insert cutters of different configurations as shown in U.S. Pat. No. 3,085,607. Thus, one disc with a multitude of insertable cutters, provides many different cutting functions. It is also known to use a reversible disc with different cutters on opposite disc faces whereby, on rotating the disc, the same disc, depending on which side is up, provides two cutting operations as disclosed in said Ser. No. 967,042 co-pending and commonly assigned application supra. In such a food processor as just described, an improved disc 32 is provided that allows the use of one disc to perform up to four different cutting functions or processing modes. This is accomplished in the standard processor by making the cutter disc drive 14 reversible as described above. By reversing the direction of rotation on the disc it is possible, for instance, to slice vegetables in the clockwise direction and shred in the counterclockwise direction as shown in FIG. 2. A cutting member, by the configuration, cuts only in one direction while allowing the food to slide over the opposite cutting member when the disc is travelling in one direction. On reversal of direction, the opposite cutting member takes over to perform a different cutting function while the food slides over the original cutting member which is thus rendered inoperative. By completely reversing the disc on the shaft a further pair of similar oppositely directed cutting members may be disposed on the opposite face so that by reversing the disc and reversing the rotation, it is possible to obtain up to four cutting functions with a single disc.

To this end, reference is made to FIG. 2 wherein a first cutting member in the form of a slicer 40 is provided on the upper surface of disc 32 and is designed to cut in a customary fashion on clockwise rotation when the disc rotates about shaft 14. Control hub 43 on the disc has a suitable "D" aperture for driving engagement by shaft 14. Any cutting member 40 may be used and a typical slicer is shown. For a different cutting function, the customary rasp or shredder 42 forms a second cutting member that is disposed substantially diametrically opposite cutting member 40, so that the disc is better balanced statically and dynamically, and cutting member 42 is directed opposite first cutting member 40 to perform a cutting function when disc rotation is in the opposite direction or counterclockwise as shown. Since the two cutting members 40 and 42 are facing opposite to one another, it will be apparent that as cutting member 40 cuts a slice in clockwise rotation, the food resting on the top of the disc 32 thus passes over in the non-cutting direction of cutting member 42 so that member 42 is rendered inoperative. In the reverse direction of rotation, when 42 shreds the food on counterclockwise rotation, the food resting on top of disc 32 slides over cutter 40 from the back end of the cutter so cutter member 40 is rendered inoperative. In order to provide better cutting operation, the surface of disc 32 has different levels 44, 46, and 48 with each of the cutting members 40 an 42 being disposed on different levels. In order to direct the food more smoothly into the cutting members, the levels are interconnected by slanting ramps 50 and 52 thus, as a slice of food is removed by cutting member 40 the remaining uncut food slides down ramp 50 to lower it to the level of cutting member 42 where it passes over member 42 —from the rear or non-cutting direction—without being shredded, and then down ramp 52 to feed it into cutter 40 on the next rotation. Conversely, the food is gradually raised in the opposite direction of rotation to feed it into cutter member 42 where it is shredded with the remaining food being raised on ramp 50 to pass over cutting member 40—from the rear or non-cutting direction—which is inoperative whereupon the food is again raised another increment up to level 46 to be shredded by member 42. This ramping arrangement prevents sudden drops and sudden lifts to provide better cutting action and avoid jamming by the various cutting members.

When used in the food processor of FIG. 1, in order to provide better containment of the food in a round bowl 18, the disc is provided with a peripheral flange 54 that extends vertically above and below the disc surfaces 44 and 48 or, in other words, extends parallel to the inner surface of bowl 18 providing a band or guide to direct the food to the cutter members and contain the food on the disc as it rotates.

For further versatility, the same disc may be completely reversed and be provided with an additional pair of suitably formed and opposite facing cutter members indicated dotted at 56 and 58 so that there is a cutter in substantially each quadrant of the disc, being two diametrically opposite cutters on each opposite disc face as clearly seen in FIG. 2. Thus, the same disc may have up to four different cutting members each one being operative when the disc is rotated in one direction or other by shaft 14 while its companion is inoperative and then when the disc is turned over from one side to the other, the other pair of cutters are available.

Figure 4:
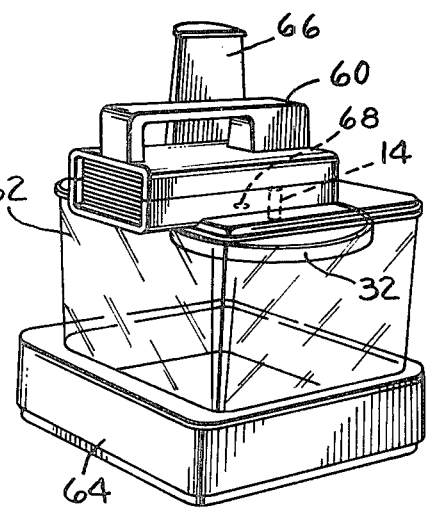

A slight modification is shown in FIG. 4 wherein a food processing appliance may use a standard hand mixer 60 that can be suitably mounted on a lid-covered bowl 62 resting and a base 64. In this form mixer 60 and base 64 act as the power base and, as well known, the mixer has contra-rotating openings in its underside in which the beaters normally snap to rotate in opposite directions. In this modification, the shaft 14 may be inserted in one of the beater openings to rotate in a given direction and drive the disc 32 to operate on the food fed into the bowl 62 through a chute 66 or, alternatively, the entire mixer 60 may be lifted out of its position and turned end-for-end to be remounted in the dotted position whereupon the oppositely rotating opening 68 in the mixer bottom is aligned over the disc so that insertion of shaft 14 in opening 68 provides the opposite rotation of disc 32 as will be apparent. This is another form of food processor to use a standard household mixer with the appropriate mounting structure and is another form of providing opposite rotation to shaft 14 so that again, the single disc 32 can provide up to four different cutting functions.

Thus, the novel reversibility of the driving shaft, the ability to completely reverse the disc and provide oppositely directed cutting surfaces on each side, cuts down on the number of discs required and increases the number of different processing modes in a much simpler version with many fewer parts. The cost of such a disc is greatly reduced over four different separate discs, storage is convenient, clean-up is simplified, and the disc may be used in a food processor or in any other cutting operation using rotating multi-function discs of the general type disclosed.

While I have hereinbefore shown a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I clam:

1. In a food processor having a power base and lid-covered bowl thereon, a cutting disc rotated by shaft means extending into and terminating in said bowl, and means providing shaft rotation in each direction, an improvement in said disc comprising,
   a first cutting member on the disc surface facing in the direction of a selected shaft rotaton and,
   a second cutting member on the said disc surface facing opposite the first cutting member,
   whereby one of said members performs a cutting operation in either direction of disc rotation while the other member is rendered inoperative.

2. Apparatus as described in claim 1 wherein said cutting members are disposed substantially diametrically opposite to dynamically balance one another.

3. Apparatus as described in claim 2 wherein said disc surface has multiple levels and each cutting member is disposed on a different level.

4. Apparatus as described in claim 3 wherein slanted ramps connect each of said different disc surface levels.

5. Apparatus as described in claim 4 wherein the disc has a peripheral flange thereon extending parallel to the inner bowl surface guiding the food to said cutter members.

6. Apparatus as described in claim 2 wherein the disc is reversible and has a pair of oppositely facing cutter members on each disc surface with a cutter member in each quadrant providing four different cutting functions on a single disc.

7. A rotary cutter disc for use in multiple cutting operations comprising,
   a centrally disposed apertured hub having means for driving engagement with a rotating shaft,
   a first cutting member on the disc surface facing in the direction of rotation of said shaft,
   a second cutting member on the said disc surface facing opposite the first cutting member,
   whereby one of said members performs a cutting operation in either direction of disc rotation on said shaft while the other member is rendered inoperative.

8. A disc as described in claim 7 wherein said cutting members are disposed substantially diametrically opposite to dynamically balance one another.

9. A disc as described in claim 8 wherein said disc surface has multiple levels and each cutting member is disposed on a different level.

10. A disc as described in claim 9 wherein slanted ramps connect each of said different disc surface levels.

11. A disc as described in claim 10 wherein the disc has a peripheral flange thereon extending vertical to the disc surface to provide a band around the periphery.

12. A disc as described in claim 8 wherein the disc is reversible and has a pair of oppositely facing cutter members on each disc surface with a cutter member in each quadrant providing four different cutting functions on a single disc.

* * * * *